(12) United States Patent
Miner

(10) Patent No.: US 8,719,973 B2
(45) Date of Patent: May 13, 2014

(54) PORTABLE TOILET

(76) Inventor: Michael L. Miner, Pierceton, IN (US)

( * ) Notice: Subject to any disclaimer, the term of this patent is extended or adjusted under 35 U.S.C. 154(b) by 361 days.

(21) Appl. No.: 13/135,749

(22) Filed: Jul. 14, 2011

(65) Prior Publication Data
US 2012/0011645 A1   Jan. 19, 2012

Related U.S. Application Data

(60) Provisional application No. 61/399,630, filed on Jul. 15, 2010.

(51) Int. Cl.
*A47K 11/04* (2006.01)
*A47K 11/03* (2006.01)
*A47K 11/02* (2006.01)

(52) U.S. Cl.
USPC ...................... 4/476; 4/467; 4/460

(58) Field of Classification Search
USPC .................. 4/476, 467, 473, 460, 486, 449, 4/461–464, 466, 468, 469, 474; 414/216, 414/217, 219, 221
See application file for complete search history.

(56) References Cited

U.S. PATENT DOCUMENTS

| | | | | | |
|---|---|---|---|---|---|
| 548,395 | A | * | 10/1895 | Roger, Jr. | 4/473 |
| 2,154,259 | A | * | 4/1939 | Beaver | 4/467 |
| 2,503,962 | A | * | 4/1950 | Moen | 4/434 |
| 2,530,482 | A | * | 11/1950 | Rothe et al. | 4/249 |
| 3,504,381 | A | * | 4/1970 | Dewey | 4/321 |
| 4,504,983 | A | * | 3/1985 | Goodyer | 4/321 |
| 6,081,939 | A | * | 7/2000 | Dainelli | 4/449 |

* cited by examiner

*Primary Examiner* — Gregory Huson
*Assistant Examiner* — Christine Skubinna

(57) ABSTRACT

A portable toilet with mechanism that causes the toilet to flush as the door to the toilet enclosure is opened.

2 Claims, 5 Drawing Sheets

PORTABLE TOILET

This application claims priority based upon U.S. Provisional Application Ser. No. 61/399,630, filed Jul. 15, 2010.

FIELD OF THE INVENTION

The invention disclosed herein relates to a novel improvement to a portable toilet.

BACKGROUND OF THE INVENTION

Toilets are well known in the art including porta-potty toilets and mobile toilets that are not connected to fixed waste treatment facilities. Common porta-potties known in the art consist of a toilet seat mounted with open access to a holding tank. The open access of the toilet seat opening to the holding tank is undesirable because the user is exposed to the view and smell of sewage in the holding tank. Portable toilets, such as those used in travel trailers or some boats have improved upon a mere opening with a movable valve, however the user is still exposed to the undesirable sights and odors of the sewage in the holding tank when the valve is operated to flush the toilet contents into the holding tank. While there are variations of the mere opening or movable valve for discharge of the toilet contents into a holding tank, they all suffer the same short coming. The toilet user is either exposed to the site and odor of the holding tank because of the open passageway or is exposed to the site and odor of the holding tank as a result of the user manually flushing the toilet which opens the passageway to the holding tank.

SUMMARY OF THE INVENTION

The present invention relates to a portable toilet. The portable toilet includes a novel means for flushing the toilet contents into the holding tank while avoiding exposing the toilet user from the sight or odor of the holding tank contents. A portable toilet typically consists of a toilet seat communicating via a passageway to a holding tank. Waste from prior use of the toilet is stored in the holding tank until it is convenient to dispose of the waste in an environmentally appropriate manner.

The waste in the holding tank is objectionable to view and smell. The waste contents in the holding tank can become more objectionable depending on the period of time before the contents are purged from the holding tank. To avoid the objectionable nature of the waste in the holding tank it is desirable to maintain a seal in the passageway between the toilet seat and the holding tank. The current art is ineffective at maintaining a continuous seal between the toilet and the holding tank while the waste is flushed into the holding tank.

The present invention utilizes a novel means of maintaining a continuous seal between the toilet seat and the holding tank while the user of the toilet is present. The sealing means is provided by a drum having a concave receiving area. The drum is sealed in such a way so that odors are not vented from the holding tank to the toilet seat area. When the toilet is in use the concave receiving area is positioned facing up. When the waste is to be deposited into the holding tank the drum rotates so the concave area that previously was facing up is positioned sufficiently downward so the waste contents in the concave area of the drum flows into the holding tank.

The drum is rotated via mechanical means only when the user of the toilet exits the area of the toilet.

DETAILED DESCRIPTION OF THE INVENTION

Figure 1:
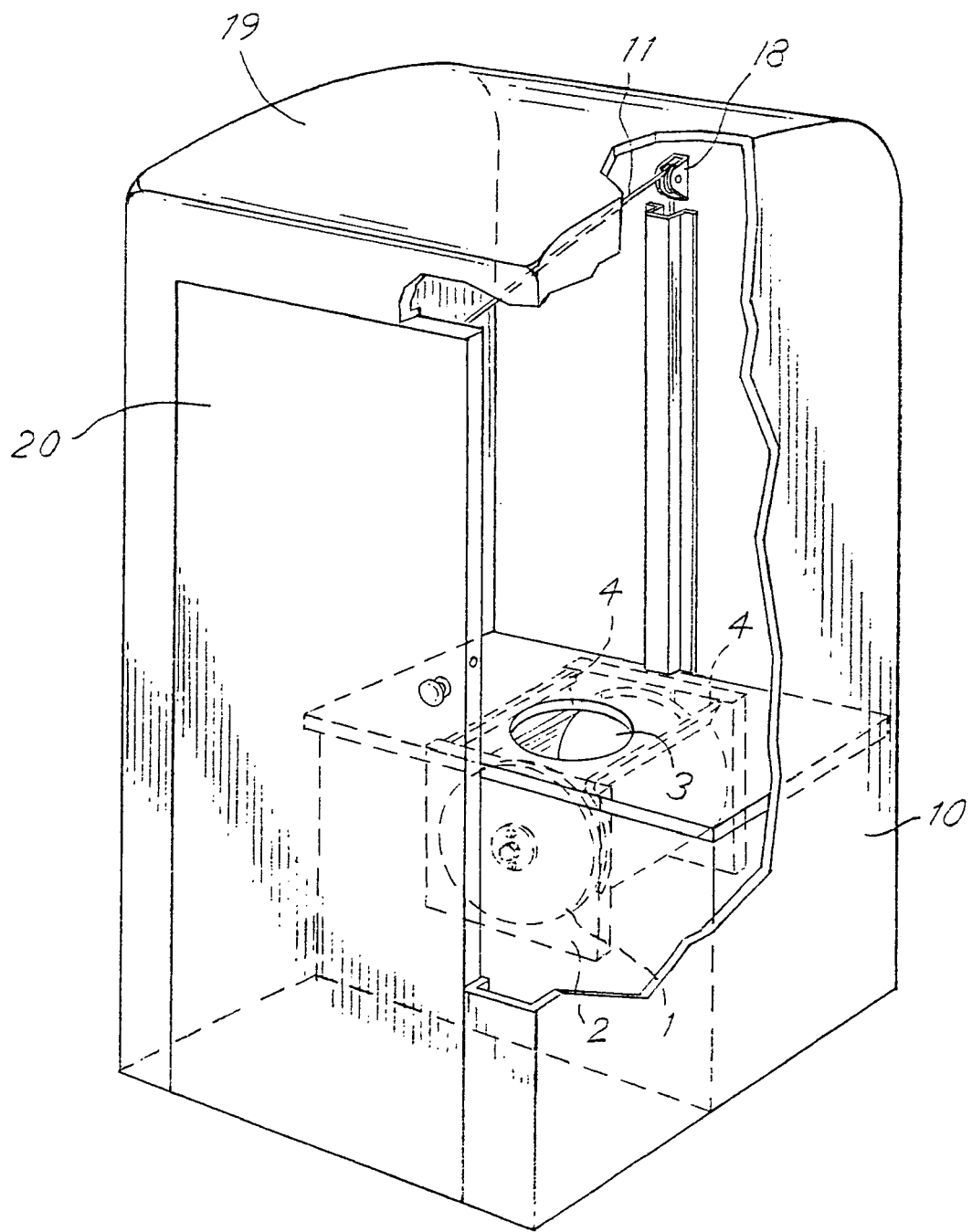
FIG. 1 is a view in perspective of a portable toilet made pursuant to the teachings of the present invention.
Figure 2:
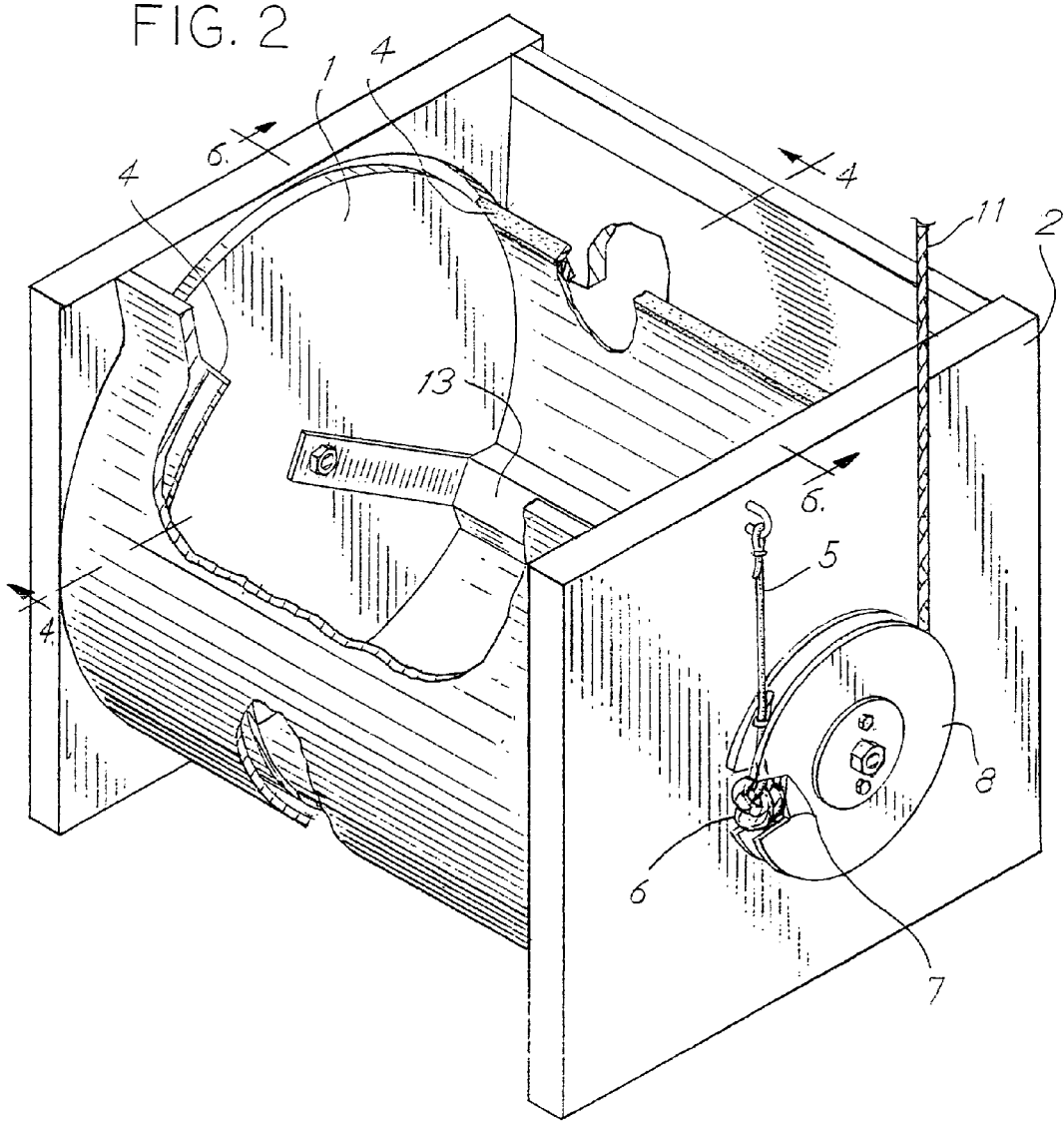
FIG. 2 is a view in perspective of the flush drum showing the pulley and cord assembly.

Referring to FIGS. 1-6, a portable toilet that utilizes a holding tank 10 to receive and hold waste. FIG. 1 shows a cutaway view of a porta-potty enclosure 19, with a door 20, toilet seat 3, flush drum 1, holding tank 10, and pulley and rope system 18 that coordinates the movement of the door with position of the flush drum. The flush drum rests within a housing 2 positioned beneath the toilet seat 3. When in the "ready" position as shown in FIG. 2, the opening of the concave portion of the drum 4 faces up, toward the toilet seat. It is held in this position by the spring tension of the elastic cord 5 tensioned by the knot 6 against the notch 7 in the pulley 8. In this position flexible rubber seals 9 protect the user from the noxious odors. The flush drum conceals the contents of the holding tank from the user and guards against accidental loss of valuables into the holding tank.

Figure 3:
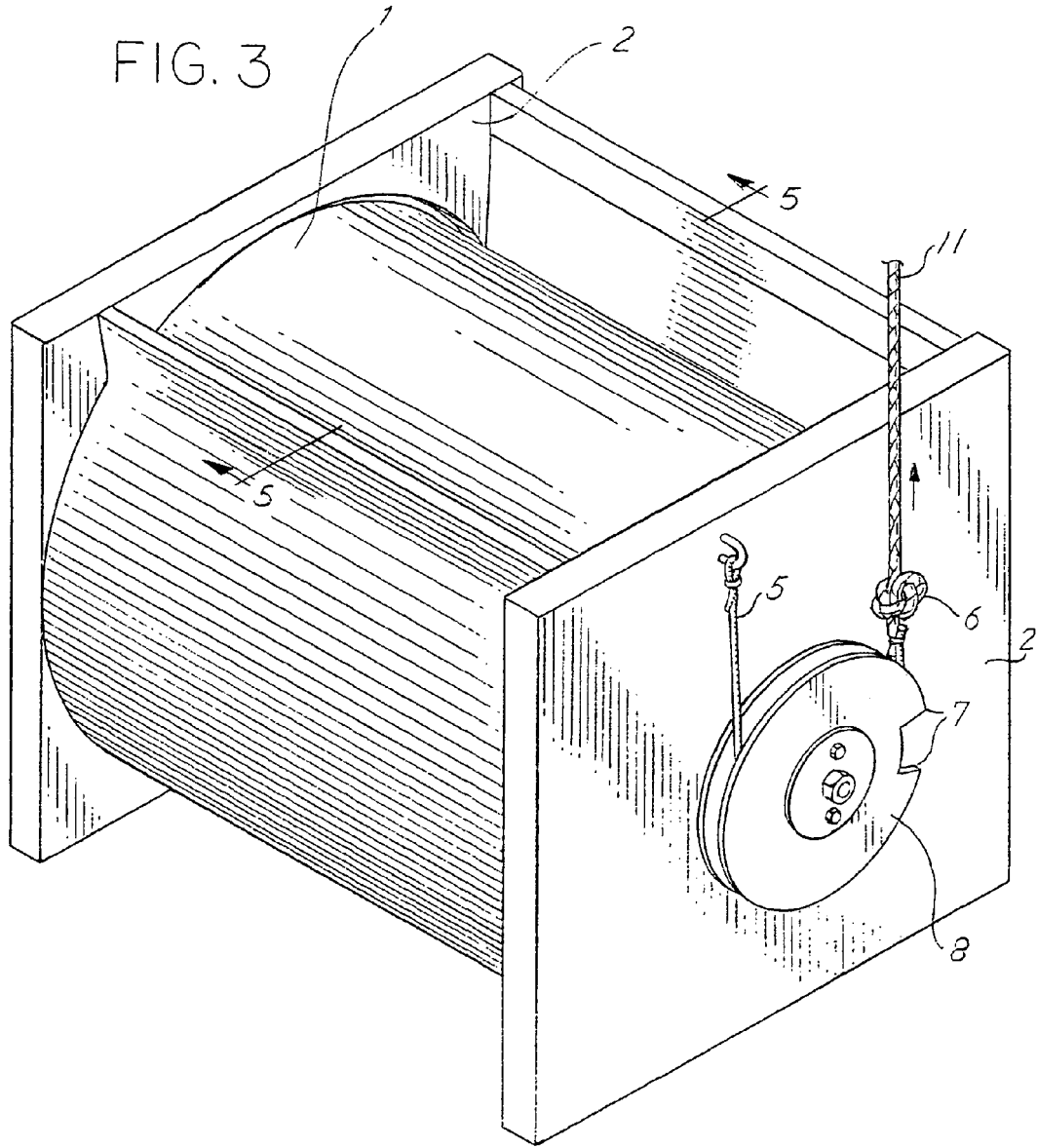
FIG. 3 is a view similar to FIG. 2 but the flush drum is rotated to a second position.

After use of the facilities the user opens the door 20, the door pulls on the rope 11, which turns the pulley 8. The flush drum 1 is fully rotated when the door is partially opened a few inches. The knot 6 then slides out of the notch 7 as shown in FIG. 3, so the door can open completely. Then when the door is shut, the spring 5 pulls the knot 6 back into the notch 7 which pulls the pulley 8 back to the ready position.

Figure 4:
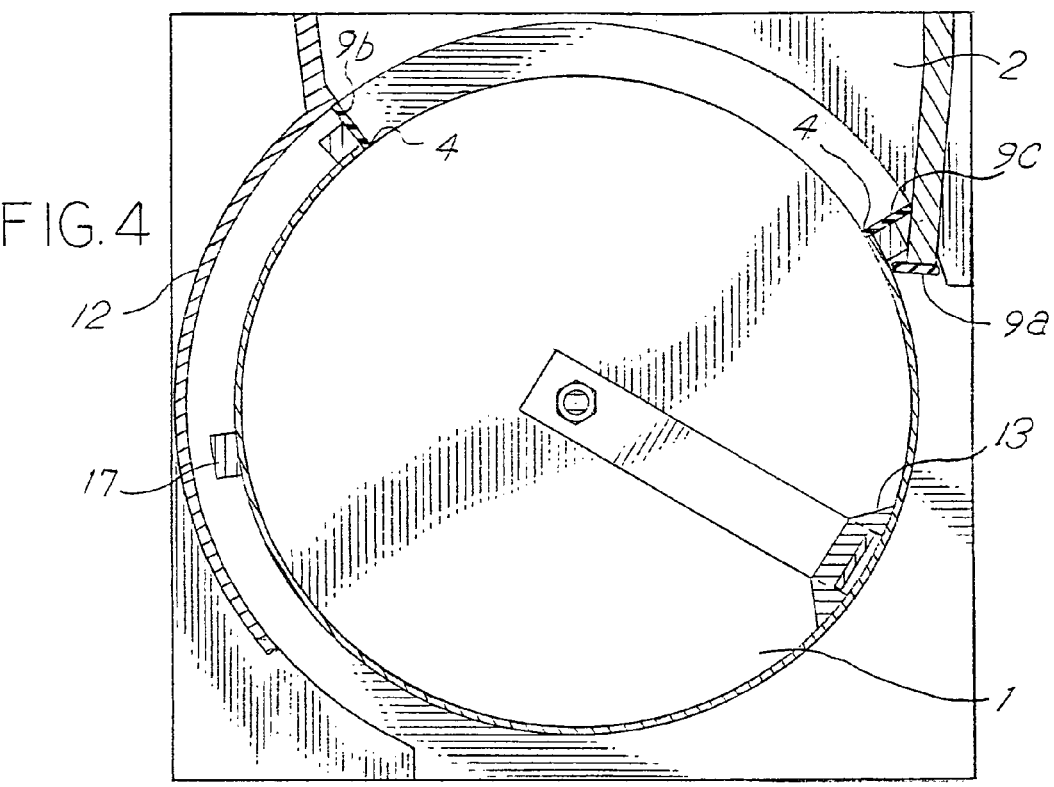
FIG. 4 is a cut-away view of FIG. 2.
Figure 5:
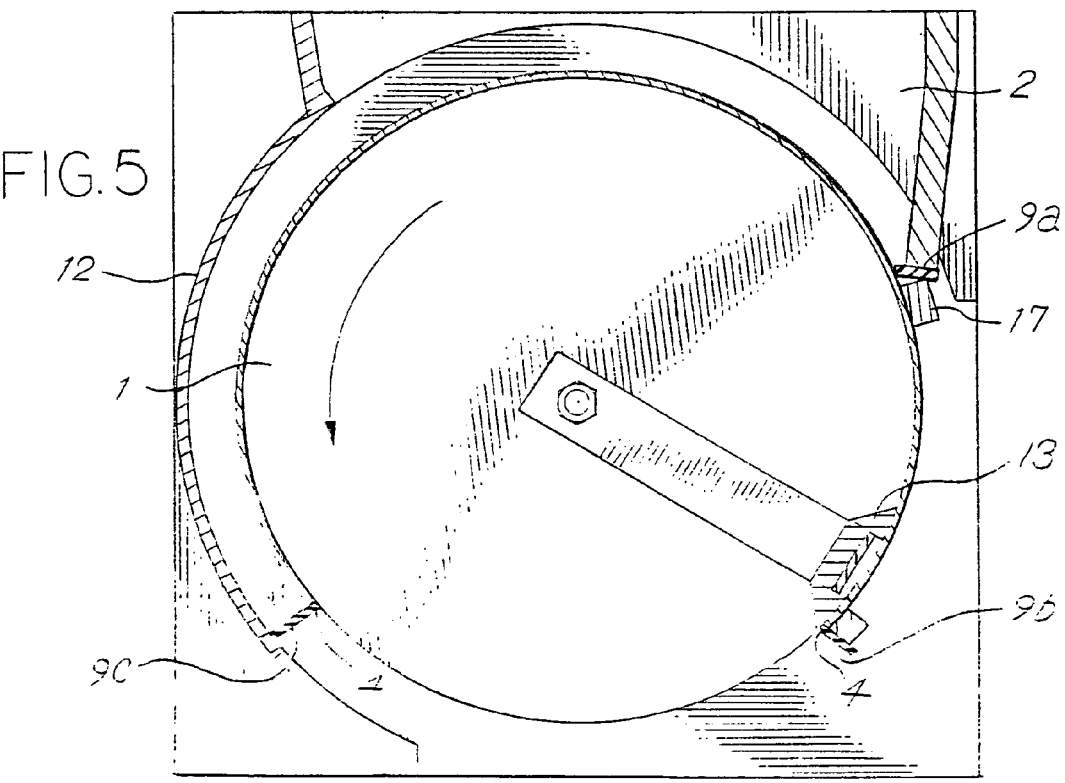
FIG. 5 is a cut-away view of FIG. 3.

When the pulley 8 rotates it turns the flush drum 1 from the ready position shown in FIG. 4 to the flush dump position shown in FIG. 5. As the flush drum 1 rotates, seal 9a maintains an odor seal against the outside of the drum 1, and seal 9b maintains an odor seal against the sealing wall 12 until seal 9c seals against the sealing wall 12. The rotation is halted in the dump position when the stop bar 17 contacts seal 9a, as shown in FIG. 5. In the dump position, seal 9c is still in contact with the seal wall 12.

Figure 6:
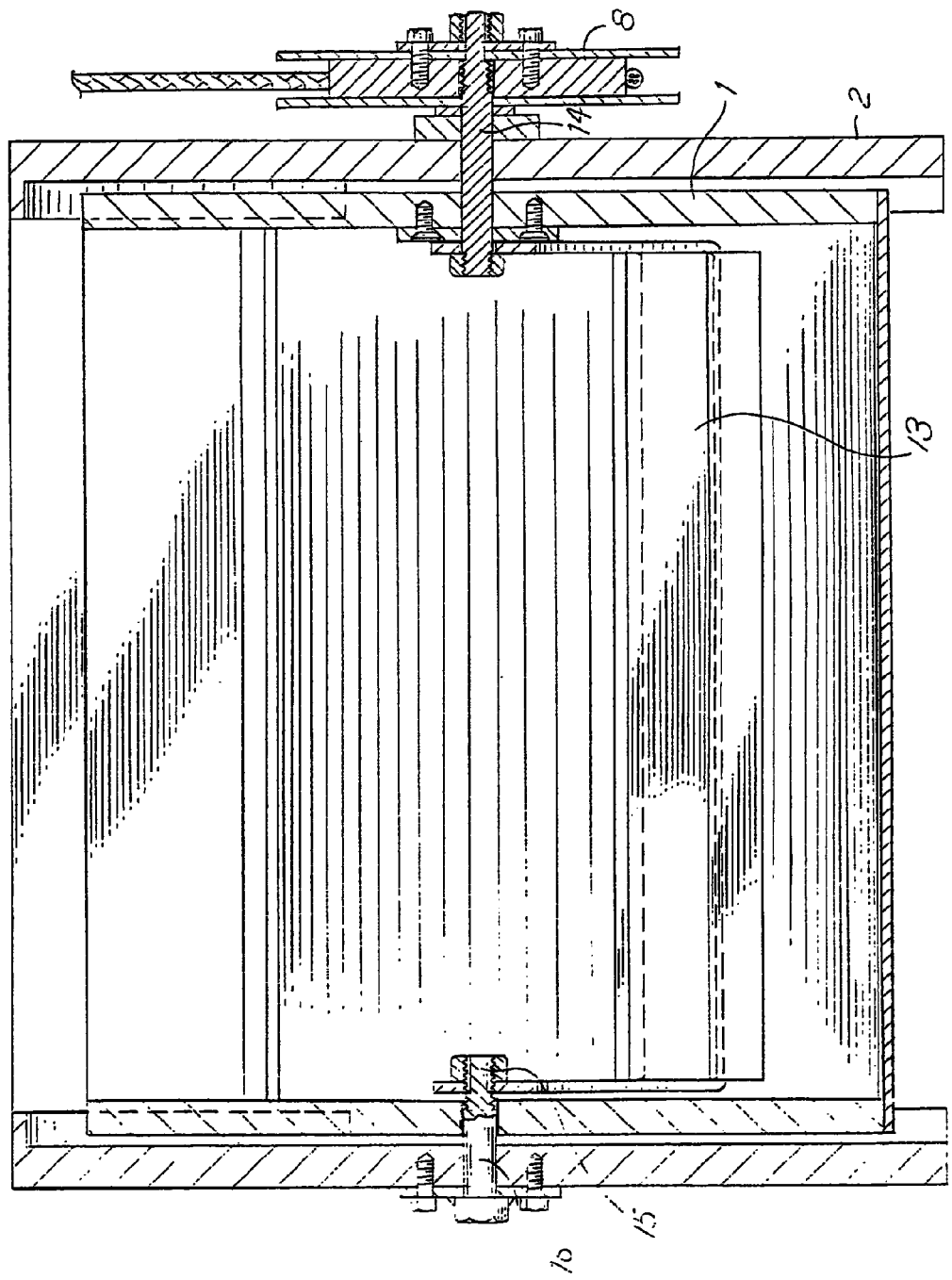
FIG. 6 is a cut-away view of FIG. 2.

As the flush drum 1 rotates, the scraper blade 13 remains stationary and removes any fecal matter from the flush drum 1. As shown in FIG. 6 the pulley 8 moves in unison with the flush drum. The shaft 14 turns within the housing 2, and the scraper blade 13 turns on the shaft 14. The scraper blade 13 is slotted to fit on a flattened portion 15 of the shaft 16 which is fixed to the housing which prevents the scraper blade from turning while the flush drum rotates on the shaft 16.

Immediately below the toilet seat 3 is a flush drum 1. As shown in FIGS. 1, 2, and 3 the flush drum has a concave area which is oriented toward the toilet seat in its normal state when the door is in a closed position. Through a series of ropes and pulleys 18, when the door is opened the flush drum rotates so the concave area of the flush drum is now oriented towards the holding tank 10. When the concave section of the flush drum is oriented towards the holding tank any waste resting in the flush drum is allowed to pass down into the holding tank.

FIG. 4 shows a cross-section of FIG. 2. FIG. 4 shows the concave area of the flush drum 1 facing up oriented toward the toilet seat 3. This is the first position of the flush drum when the toilet is being used. Integrated into the flush drum are seals 9 which prevent fumes in the holding tank 10 from venting upward towards toilet opening and the user of the toilet. The edges of the flush drum are in contact with the sealing wall 12.

FIG. 5 shows the same cross-section as FIG. 4, in FIG. 5 the flush drum 1 has been rotated to the flushing position to allow any waste in the concave area of the flush drum to pass into the holding tank 10. The rotation of the flush drum to the position showed in FIG. 5 is caused by the door 20 of the porta-potty enclosure 19 being opened as the toilet user exits the porta-potty enclosure. As the door swings open it exerts a tension upon the rope 11 connected to the door. The rope passes over pulleys 8 and 18 with the rope connected to the head pulley 8. Tension on the rope causes the flush drum to rotate. In an alternative embodiment, a spring (not shown) integrated into the pulley, applies force to cause the door to close and the flush drum to rotate back to its first position for use. However, any means to cause the door to close and the flush drum to rotate to its first position is acceptable.

The flush drum 1 can preferably be made of any material that has low adhesion to waste material. Examples of such material are taught in U.S. Pat. No. 3,504,381.

What is claimed:

1. A portable toilet that includes;
    a toilet seat with a passageway that communicates with a holding tank, the passageway includes a sealing wall and a flush drum that rotates about an axis in a housing, the flush drum having an inside and an outside, and the flush drum defining a space with a concave area and;
    wherein the flush drum has a first position for use, whereby the concave area is oriented upward toward the toilet seat, with a seal engaging the flush drum which prevents fumes in the holding tank from passing to the toilet and;
    wherein the flush drum has a second position for use, defined by the flush drum as it rotates and whereby the concave area of the flush drum is oriented in a downward position and opening toward the holding tank,
    with a plurality of seals attached to the flush drum for preventing fumes in the holding tank from passing to the toilet, whereby as the flush drum rotates, the seal maintains contact against the outside of the flush drum and at least one of the plurality of seals maintains contact against the sealing wall so that there is always a complete seal between the holding tank and the toilet and;
    wherein the axis has a head pulley that incorporates a means that exerts force to hold the flush drum in the first position, and; the head pulley includes a means for applying force to the head pulley causing the flush drum to rotate to the second position with the concave area of the flush drum oriented in a downward position toward the holding tank thereby allowing the waste resting in the concave area of the flush drum to pass to the holding tank, and;
    wherein a means for removing waste matter causes the waste to be dislodged from the flush drum into the holding tank and the flush drum is made from a material that has a low adhesion to waste material.

2. The portable toilet of claim 1, further comprising;
    wherein the means for removing waste is a scraper blade that urges the waste from the flush drum and;
    a shaft, fixed to the housing such that the flush drum rotates about the shaft, the shaft having a flattened portion and;
    the scraper blade having a slot with the slot fitted on the flattened portion of the shaft such that the scraper is secured to the housing and prevented from turning while the flush drum rotates.

* * * * *